US011023258B2

(12) United States Patent
Upasani et al.

(10) Patent No.: US 11,023,258 B2
(45) Date of Patent: Jun. 1, 2021

(54) SELF-MORPHING SERVER PLATFORMS

(71) Applicant: Intel Corporation, Santa Clara, CA (US)

(72) Inventors: Neeraj S. Upasani, Portland, OR (US); Jeanne Guillory, Hillsboro, OR (US); Wojciech Powiertowski, Portland, OR (US); Sergiu D Ghetie, Hillsboro, OR (US); Mohan J. Kumar, Aloha, OR (US); Murugasamy K. Nachimuthu, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 999 days.

(21) Appl. No.: 15/396,077

(22) Filed: Dec. 30, 2016

(65) Prior Publication Data

US 2018/0189081 A1  Jul. 5, 2018

(51) Int. Cl.
*G06F 9/445* (2018.01)
*H04L 12/24* (2006.01)
(Continued)

(52) U.S. Cl.
CPC ........ *G06F 9/44521* (2013.01); *G06F 9/4401* (2013.01); *G06F 15/7807* (2013.01);
(Continued)

(58) Field of Classification Search
CPC .............. G06F 9/44521; G06F 9/4401; G06F 15/7807; G06F 15/7867; G06F 8/654;
(Continued)

(56) References Cited

U.S. PATENT DOCUMENTS

2009/0055157 A1* 2/2009 Softer ................. G06F 15/7864
703/27
2015/0186171 A1* 7/2015 Kotta .................. G06F 9/45533
718/1
(Continued)

*Primary Examiner* — Henry Tsai
*Assistant Examiner* — Aurangzeb Hassan
(74) *Attorney, Agent, or Firm* — Compass IP Law PC

(57) ABSTRACT

Dynamically configurable server platforms and associated apparatus and methods. A server platform including a plurality of CPUs installed in respective sockets may be dynamically configured as multiple single-socket servers and as a multi-socket server. The CPUs are connected to a platform manager component comprising an SoC including one or more processors and an embedded FPGA. Following a platform reset, an FPGA image is loaded, dynamically configuring functional blocks and interfaces on the platform manager. The platform manager also includes pre-defined functional blocks and interfaces. During platform initialization the dynamically-configured functional blocks and interfaces are used to initialize the server platform, while both the pre-defined and dynamically-configured functional blocks and interfaces are used to support run-time operations. The server platform may be used in conventional rack architectures or implemented in a disaggregated rack architecture under which the single-socket and/or multi-socket servers are dynamically composed to employ disaggregated resources, such as memory, storage, and accelerators.

22 Claims, 12 Drawing Sheets

(51) Int. Cl.
    *G06F 15/78*     (2006.01)
    *G06F 9/4401*     (2018.01)
    *H04L 12/933*     (2013.01)
    *G06F 8/654*     (2018.01)

(52) U.S. Cl.
    CPC ...... *G06F 15/7867* (2013.01); *H04L 41/0813* (2013.01); *H04L 41/5054* (2013.01); *G06F 8/654* (2018.02); *H04L 41/5096* (2013.01); *H04L 49/109* (2013.01)

(58) Field of Classification Search
    CPC ............... H04L 49/109; H04L 41/0813; H04L 41/5054; H04L 41/5096
    See application file for complete search history.

(56) References Cited

U.S. PATENT DOCUMENTS

| | | | |
|---|---|---|---|
| 2015/0317280 A1* | 11/2015 | Magro | G06F 15/17 710/301 |
| 2017/0046291 A1* | 2/2017 | Borkenhagen | G06F 13/387 |
| 2018/0096151 A1* | 4/2018 | Ghetie | G06F 21/72 |
| 2018/0097839 A1* | 4/2018 | Upasani | G06F 21/57 |

* cited by examiner

SELF-MORPHING SERVER PLATFORMS

BACKGROUND INFORMATION

The availability and use of "Cloud" computing has expanded exponentially in the past few years. Under a conventional computing approach, users run software applications on their own computers and/or access software services hosted by local servers (such as servers run by a business enterprise). In contrast, under cloud computing the compute and storage resources are "in the cloud," meaning they are physically hosted at a remote facility that is accessed via a computer network, such as the Internet. Compute and storage resources hosted by a cloud operator may be accessed via "services," which are commonly referred to as cloud-based services, Web services or simply services.

Cloud-based services are typically hosted by a datacenter that includes the physical arrangement of servers that make up a cloud or a particular portion of a cloud. Data centers commonly employ a physical hierarchy of compute, network and shared storage resources to support scale out of workload requirements. FIG. 1 shows a portion of an exemplary physical hierarchy in a data center 100 including a number L of pods 102, a number M of racks 104, each of which includes slots for a number N of trays 106. Each tray 106, in turn, may include multiple sleds 108. For convenience of explanation, each of pods 102, racks 104, and trays 106 is labeled with a corresponding identifier, such as Pod 1, Rack 2, Tray 1B, etc. Trays may also be referred to as drawers, and sleds may also have various forms, such as modules and nodes. In addition to tray and sled configurations, racks may be provisioned using chassis in which various forms of servers are installed, such as blade server chassis and server blades.

Depicted at the top of each rack 104 is a respective top of rack (ToR) switch 110, which is also labeled by ToR Switch number. Generally, ToR switches 110 are representative of both ToR switches and any other switching facilities that support switching between racks 104. It is conventional practice to refer to these switches as ToR switches whether or not they are physically located at the top of a rack (although they generally are).

Each Pod 102 further includes a pod switch 112 to which the pod's ToR switches 110 are coupled. In turn, pod switches 112 are coupled to a data center (DC) switch 114. The data center switches may sit at the top of the data center switch hierarchy, or there may be one or more additional levels that are not shown. For ease of explanation, the hierarchies described herein are physical hierarchies that use physical LANs. In practice, it is common to deploy virtual LANs using underlying physical LAN switching facilities.

The cloud-hosted services are generally categorized as Software as a Service (SaaS), Platform as a Service (PaaS), and Infrastructure as a Service (IaaS). SaaS services, also commonly called Web services and cloud application services, enable access to services running on datacenter servers via a network connection and client-side interface, such as a Web browser. Well-known examples of SaaS services include e-mail Web services (e.g., Google gmail, Microsoft Hotmail, Yahoo mail), Microsoft Office 365, Salesforce.com and Google docs. PaaS, also known as cloud platform services, are used for applications and other development, while providing cloud components to software. Examples of PaaS include Amazon Web Services (AWS) Elastic Beanstalk, Windows Azure, and Google App Engine.

IaaS are services for accessing, monitoring, and managing remote datacenter infrastructures, such as computer (virtualized or bare metal), storage, networking, and networking services (e.g., Firewalls). Instead of purchasing and running their own physical hardware, users can purchase IaaS based on consumption. For example, AWS and Windows Azure respectively offer use of Amazon and Microsoft datacenter resources on a resource allocation/consumption basis. Amazon Elastic Compute Cloud (EC2) is a central part of AWS.

Cloud infrastructures greatly value platform density, security, patchability, flexibility and dynamic configurability in order to run the cloud workloads in the most secure and efficient manner. While platform virtualization addresses some of these attributes and capabilities, the use of software-based approaches adds processing overhead, reducing efficiency. In addition, software-based approaches are generally more susceptible to malicious attacks than hardware-based approaches.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein like reference numerals refer to like parts throughout the various views unless otherwise specified.

DETAILED DESCRIPTION

Figure 1:
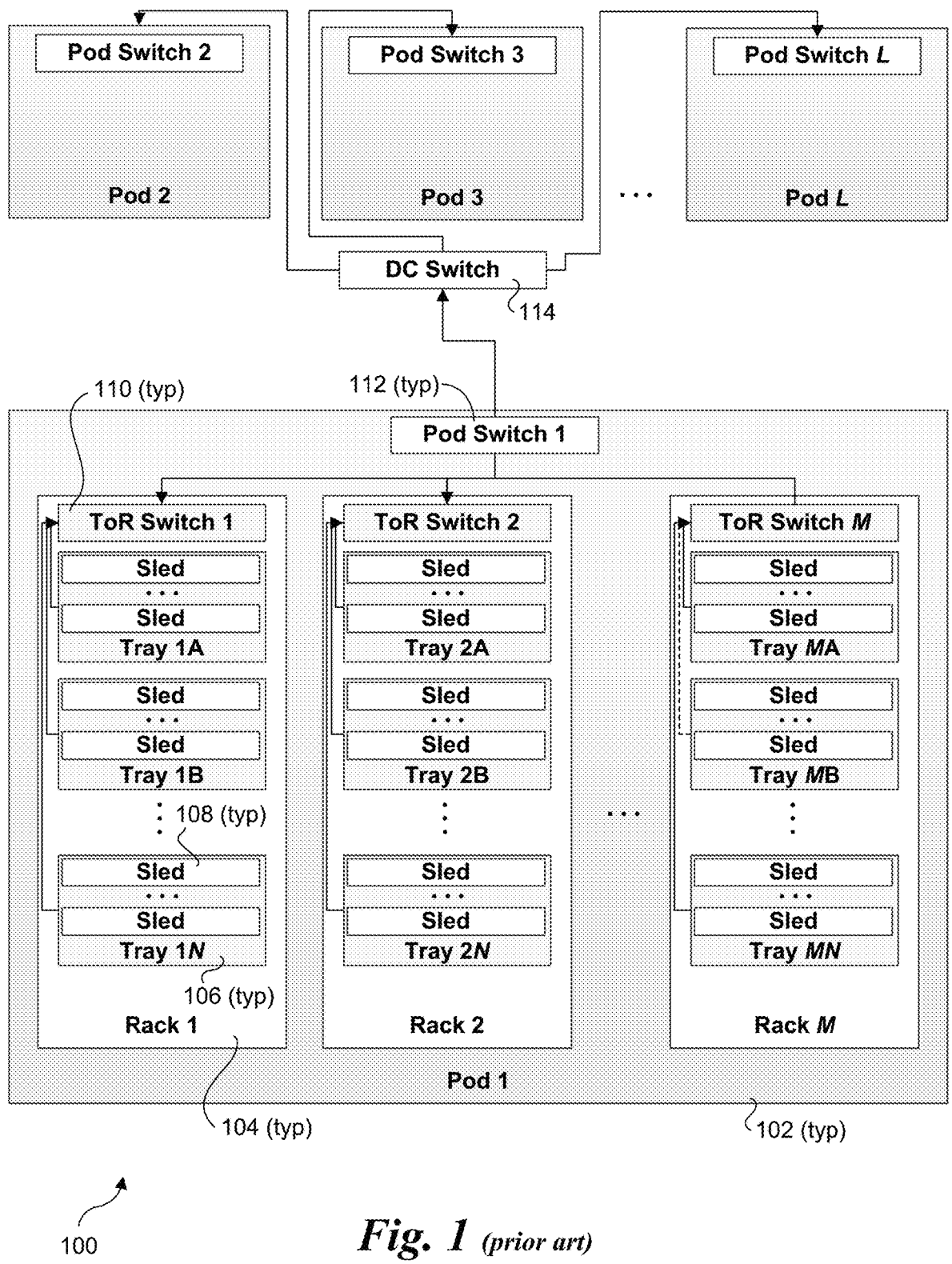
FIG. 1 is a schematic diagram of a conventional physical rack configuration in a data center.

Embodiments of dynamically configurable server platforms and associated apparatus and methods are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

For clarity, individual components in the Figures herein may also be referred to by their labels in the Figures, rather than by a particular reference number. Additionally, reference numbers referring to a particular type of component (as opposed to a particular component) may be shown with a reference number followed by "(typ)" meaning "typical." It will be understood that the configuration of these components will be typical of similar components that may exist but are not shown in the drawing Figures for simplicity and clarity or otherwise similar components that are not labeled with separate reference numbers. Conversely, "(typ)" is not to be construed as meaning the component, element, etc. is typically used for its disclosed function, implement, purpose, etc.

In accordance with aspects of the embodiments described herein, methods and apparatus for implementing dynamic reconfiguration of server systems are disclosed. For example, such dynamic reconfiguration methods and apparatus enable server systems to adapt to specific workloads that favor certain platform topologies over others (e.g., single socket vs. multi-socket). The embodiments also include a customizable platform manager that optimizes platform efficiency and density. In addition, the embodiments allow x86-based server systems to boot without requiring a traditional "South Bridge" (aka Platform Controller Hub or PCH).

The embodiments provide the following attributes and capabilities: Dynamic reconfiguration of the server systems from multiple single socket systems on the same board to a multi-socket system on the same board and vice versa; boot system without traditional PCH; increased platform resiliency and security; increased platform density (reduced number of platform components), design flexibility and customer customizable easy platform reconfiguration; and improved platform manageability.

The core component is a System on a Chip (SoC) Field Programmable Gate Array (FPGA) product with multiprocessor SoC sub-system, hardened Input/Output (I/O) blocks and programmable logic elements that allow custom logic implementation that is integrated into the SoC subsystem.

Some advantages of the custom logic include:

Platform Security: Fully patchable hardware functions that are critical for system function, system boot as well as integral to the overall system security. As a result, this provides the ability to react to late bugs affecting critical reset/boot & security functions and fix them in a timely manner without silicon re-spin.

Example: An initial miss in some logic function that performs security filtering of transactions flowing through some critical system buses can be easily fixed in a new FPGA program image.

Platform Morphing: Manage the platform hardware personalities by providing the hooks and ability to isolate the system into independent single socket systems or combine them into a multi-socket system.

Easily build & deploy targeted solutions that are custom built for specific platforms and usages while keeping the hardware components the same.

Example 1: Implement one type of flash interface protocol, SPI on one particular platform whereas implement NAND interface on another platform. Decision is late-binding at the time of platform design, as opposed to being fixed during component design.

Example 2: Implement video port function on demand when required to connect an external monitor to the server system, else utilize space for other features required for the system in question.

Provides the ability to innovate and add platform features without requiring silicon changes, thus preserving valuable time-to-market.

Figure 2:
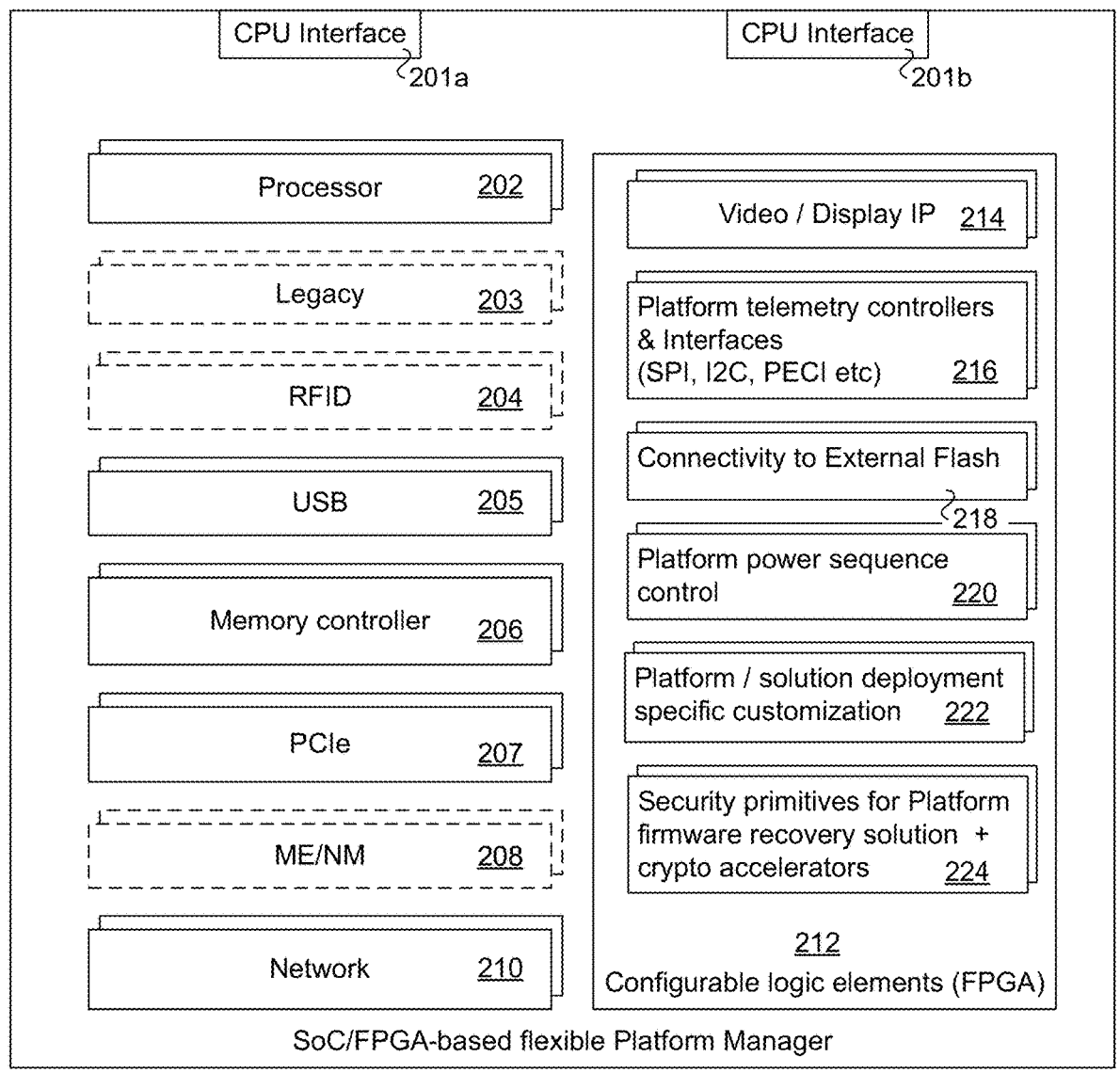
FIG. 2 is a block diagram of an SoC/FPGA-based platform manager, according to one embodiment.

In one embodiment, the foregoing functionality is implemented in an SoC/FPGA-based flexible platform manager 200, as shown in FIG. 2 (also referred to herein as "SoC/FPGA platform manager" or simply "platform manager"). SoC/FPGA platform manager 200 includes one or more interfaces that are used for communicating with two or more CPUs, as depicted by CPU interfaces 201a and 201b. Exemplary and non-limiting interfaces include DMI (Direct Media Interface) and Peripheral Component Interconnect Express (PCIe) interfaces. As illustrated in FIG. 2, in some embodiments there may be multiple instances of some components and or functional blocks on SoC/FPGA platform manager 200. As implied by its name, SoC/FPGA platform manager employs a System on a Chip architecture that includes an embedded FPGA or otherwise configurable logic elements using programmable logic devices such as FPGAs. Part of the SoC architecture is one or more processors 202, which generally may comprise single or multi-core processors, depending on the workload to be handled by the processor(s).

SoC/FPGA platform manager 200 also includes multiple pre-defined functional blocks and interfaces depicted in the blocks on the left-hand side of the diagram, including an optional legacy block 203, an optional RFID (Radio Frequency Identification) block 204, a Universal Serial Bus (USB) interface 205, a memory controller 206, a Peripheral Component Interconnect Express (PCIe) interface 207, an optional manageability engine/node manager (ME/NM) block 208, and a network block 210. The programmable components are part of an FPGA 212, and include video/display IP (Intellectual Property) block 214, platform telemetry controllers and interfaces 216, a connectivity to external Flash block 218, a platform power sequence control block 220, a platform/solution deployment specific customization block 222, and a security primitives for platform firmware recovery solution plus cryptographic accelerators block 224.

In addition to the foregoing functionality, an SoC/FPGA-based flexible platform manager may include hardened IP blocks, including, but not limited to:

Standard high speed interfaces like PCIe, USB, Network ports, etc.

Single/Multi-core processor complex for hosting manageability applications.

The SoC/FPGA platform manager enables the developer to balance hardened IP blocks vs. soft customizable logic elements, thereby optimizing performance, cost and area, and design flexibility. In one embodiment, the SoC/FPGA platform manager also provides the ability to perform its own secure boot by being able to load an authenticated programmable logic FPGA image as well as the firmware that runs on the SoC multi-processor system.

In one aspect, server CPUs are integral to the solution that are used to run the host software, either as single socket systems or multi-socket systems, decided dynamically based on incoming workloads. In one embodiment, the server CPUs are x86 server CPUs that may be dynamically configured to be implemented as multiple single socket systems, or may be combined into a multi-socket system. Moreover, such server CPUs may be implemented in a first configuration to handle a first workload, and then reconfigured to handle another workload with different performance requirements.

Figure 3A:
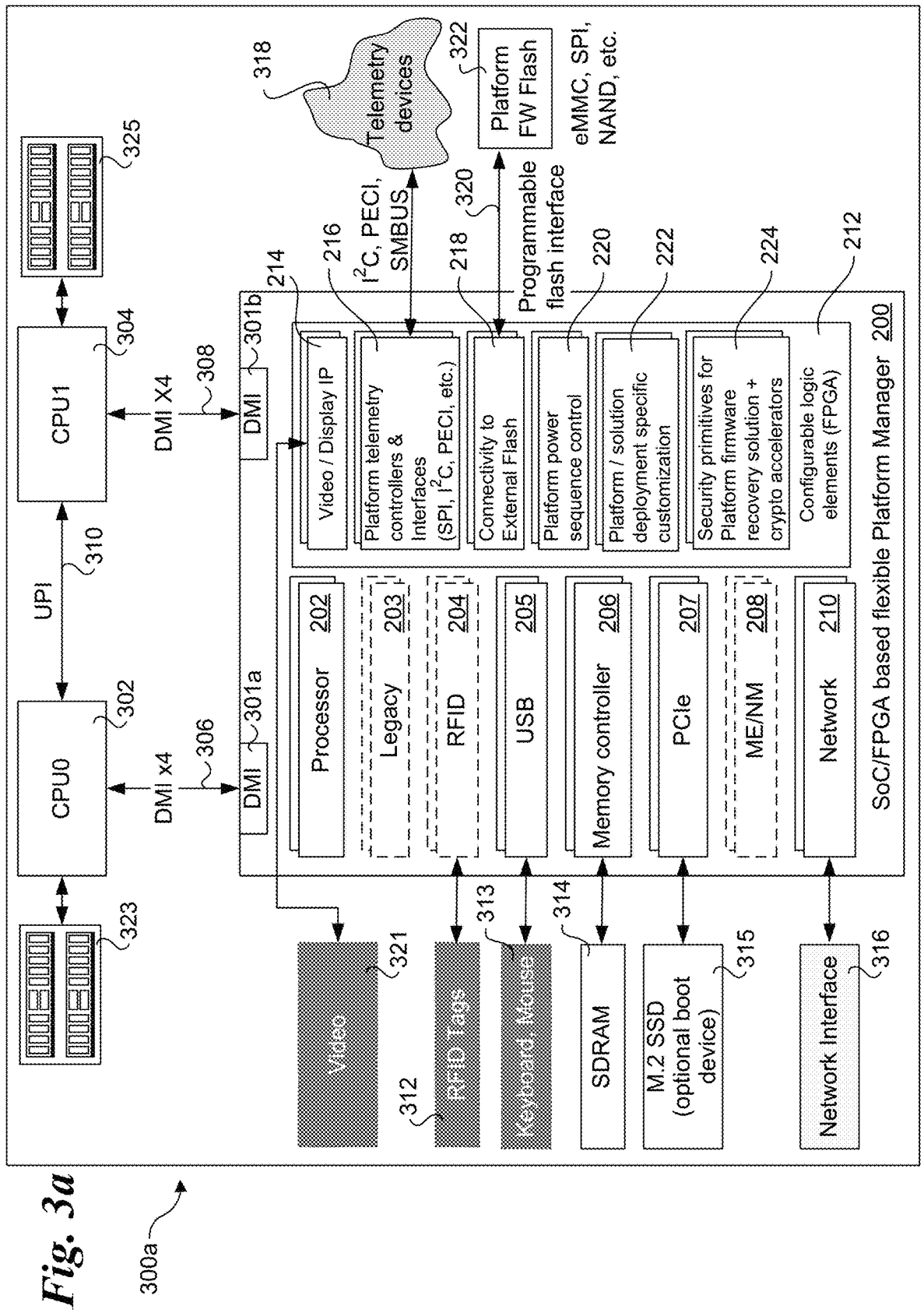
FIG. 3a is a schematic diagram of a self-morphing server platform including an SoC/FPGA platform manager employing DMI interfaces directly coupling the SoC/FPGA platform manager to respective CPUs.

One embodiment of a self-morphing server platform architecture 300a including a SoC/FPGA platform manager is shown in FIG. 3a. SoC/FPGA platform manager 300a is connected to each of CPUs 302 and 304. This connection may be achieved using various interconnect methods, including but not limited to directly connecting the CPUs to the SoC/FPGA platform manager, and aggregating multiple CPUs to SoC/FPGA platform manager connections via a switch. Examples of direct connections are depicted in FIG. 3a as respective DMI x4 (four lane) links 306 and 308 connecting CPUs 302 and 304 to DMI interfaces 301a and 301b. The use of DMI x4 links are non-limiting, as other link widths may also be used, as well as future DMI implementations.

Figure 3B:
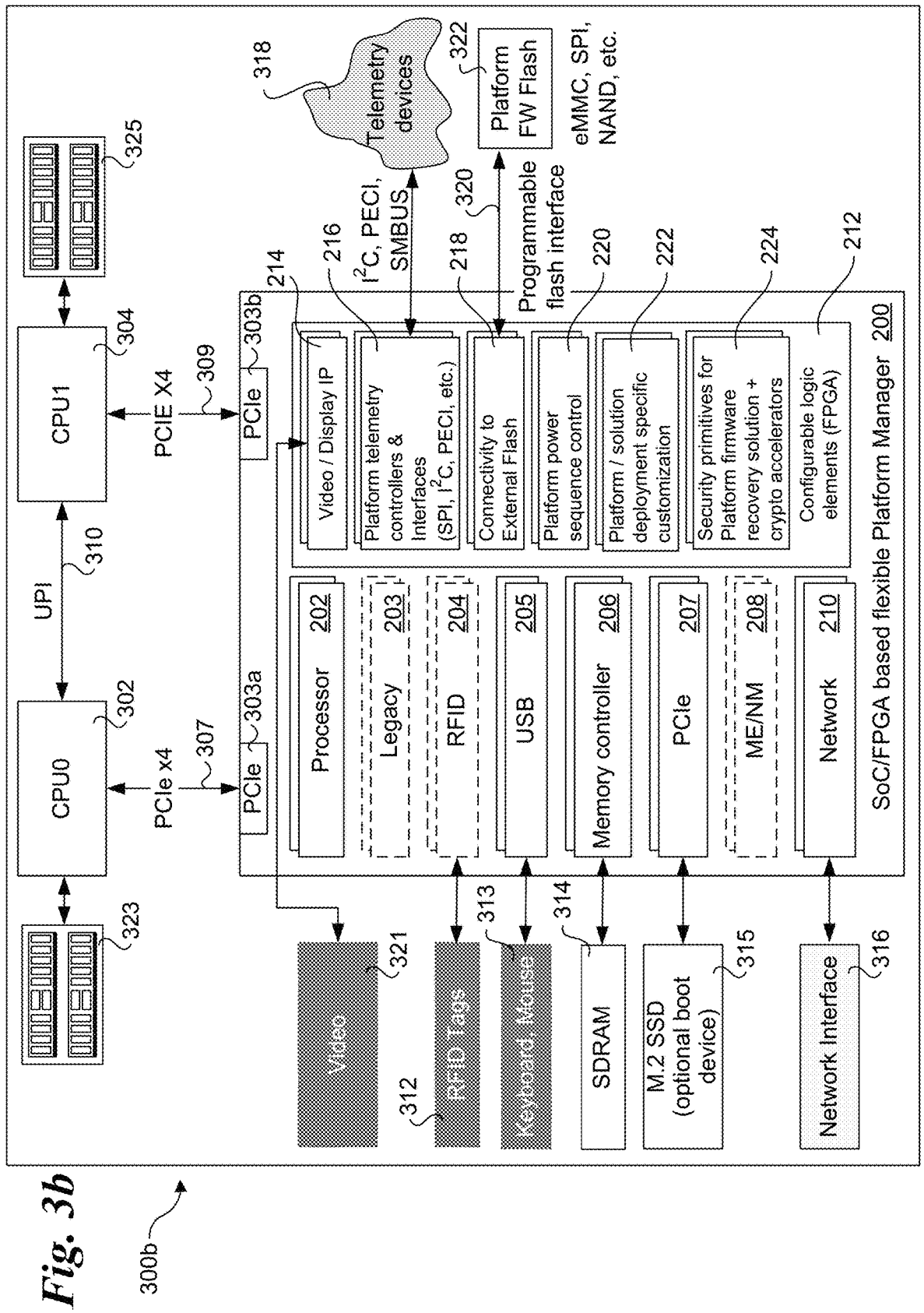
FIG. 3b is a schematic diagram of a self-morphing server platform including an SoC/FPGA platform manager employing PCIe interfaces directly coupling the SoC/FPGA platform manager to respective CPUs.

In addition to DMI interfaces and links, other interconnect technologies may be used to connect CPUs to the SoC/FPGA platform manager. For example, FIG. 3b shows a self-morphing server platform architecture 300b employing PCIe interfaces 303a and 303b and PCIe x4 links 307 and 309 to connect to CPUs 302 and 304. Generally, second, third, or future generations of PCIe may be used, as well as various link widths, with x4 (4 lane) links being a non-limiting example.

Figure 3C:
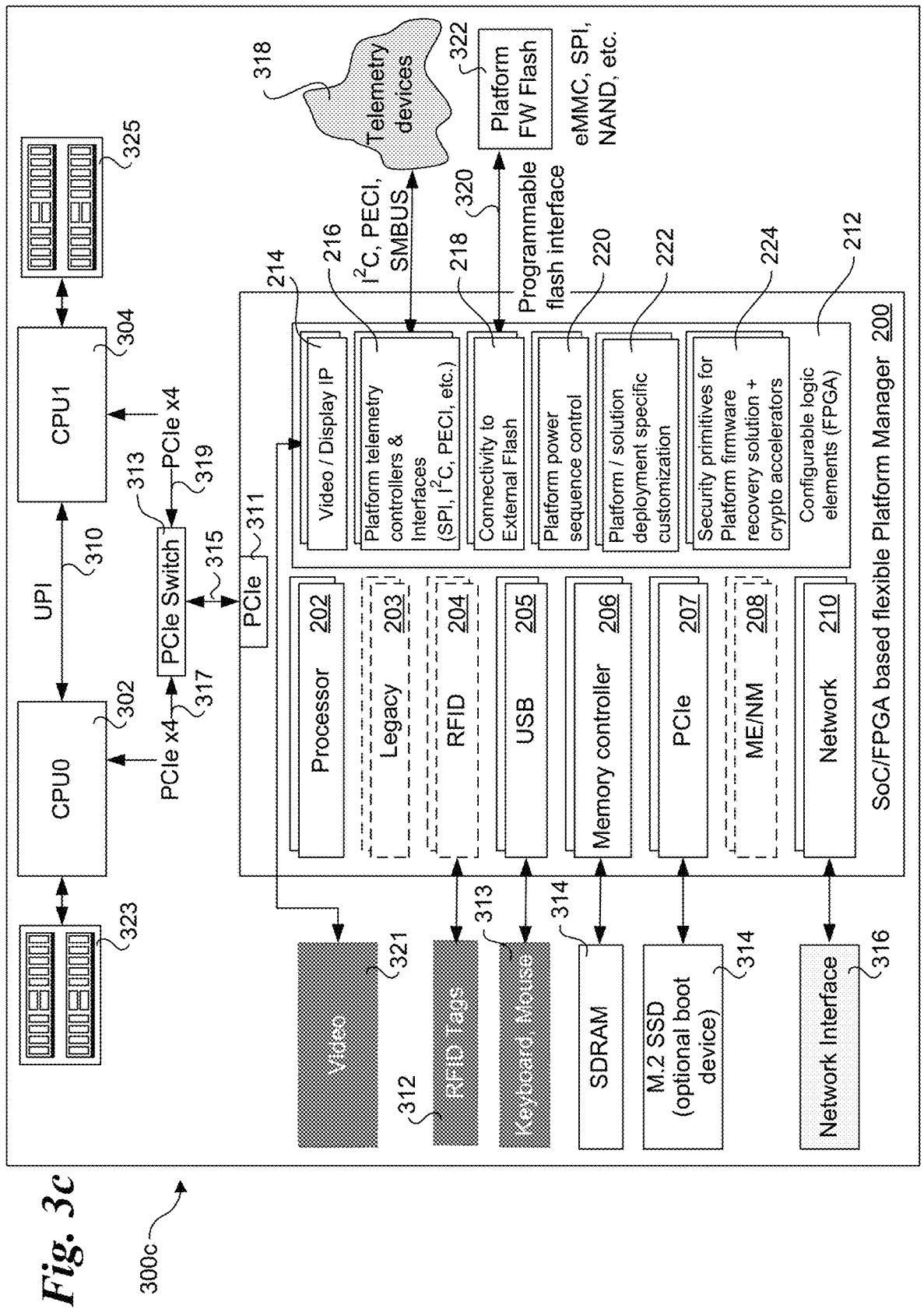
FIG. 3c is a schematic diagram of a self-morphing server platform including an SoC/FPGA platform manager employing a PCIe interface that is coupled to a switch, which in turn is coupled to multiple CPUs.

In another embodiment, SoC/FPGA platform manager is connected to multiple CPUs via PCIe links and a PCIe switch interposed between the SoC/FPGA platform manager and the CPUs. An example of this configuration is shown FIG. 3c as a self-morphing server platform architecture 300c, which includes a PCIe interface 311 that is coupled to a PCIe switch 313 via a PCIe link 315, which in turn is coupled to CPU 302 and CPU 304 via respective PCIe links 317 and 319.

Returning to FIG. 3a, CPUs 302 and 304 include memory controllers (not shown) including one or more memory channels connected to DIMMs (Dual In-line Memory Modules) 323 and 325. Generally, DIMMs may comprise volatile memory (e.g., DDR4, DDR4 DRAM) or non-volatile memory (e.g., storage class memory). Further details of various memory technologies that may be supported by the embodiments herein are described below.

CPUs 302 and 304 are interconnected via a coherent socket-to-socket link. In the illustrated embodiment, a Universal Path Interconnect (UPI) 310 is depicted. Coherent links such as UPI enable inter-socket communication when the platform is partitioned/configured to run as a multi-socket system, and also support a coherent memory and cache domain across the sockets, supporting NUMA (Non-Uniform Memory Architecture) configurations. In the case where the platform is configured to run as multiple single socket systems, the coherent links between the sockets are not trained and disabled via BIOS or firmware configurations.

Generally, optional legacy block 203 is used to support various legacy functions that may be used on some system implementations. Legacy block 203 may also include legacy interfaces that are not shown for clarity and to reduce clutter. RFID block 204 is also an optional block that may be used for associating platform resources using RFID technology. For example, various platform components may include RFID tags 312, providing the capability to track and manage platform configurations using RFID block 204. RFID block 204 may also be used for security purposes, as a sideband mechanism to communicate with server systems and force a failsafe recovery if other mechanisms have failed or as an instrument in locking the system firmware during transit to prevent unwanted firmware tampering.

USB interface 205 is coupled to a USB keyboard and mouse interface 313. In one embodiment, a USB Keyboard Mouse (KM) or Keyboard Video Mouse (KVM) interface is implemented that enables keyboard and mouse user inputs and (optionally) a video display output to be switched between servers when CPUs 302 and 304 are configured as separate server CPUs, or provide KVM inputs and outputs to a single multi-socket server when CPUs 302 and 304 are configured to implement a multi-socket server. Optionally, as shown in FIG. 3a, a video display 321 is coupled to Video/Display IP block 214, which is used to output a video signal to drive the video display. When a KVM configuration is used employing video via USB, video/display IP block 214 is internally coupled to USB interface 205 (not shown).

Memory controller 206 is coupled to one or more memory devices depicted as SDRAM 314. Generally, memory controller 206 may support access to volatile memory (e.g., DDR4 or DDR5 DRAM, SDRAM), non-volatile memory devices, or both. The memory may be used for various purposes, including but not limited to use as video memory.

PCIe interface 207 is coupled to an optional boot device depicted as an M.2 solid state drive (SSD) 315, such as but not limited to a non-volatile memory express (NVMe) boot SSD. PCIe interface 207 may also be coupled to other PCIe devices (not shown).

Optional ME/NM block 208 may be implemented to provide manageability engine and/or node management functionality. To support this functionality, it may be internally connected to one or more other blocks and interfaces (not shown).

Network block 210 is coupled to a network interface 316, which will be coupled to a network (not shown) when a compute platform employing any of self-morphing server platform architectures 300a, 300b, or 300c is deployed. Generally, network block 210 may support connection to one or more types of network interfaces, including but not limited to Ethernet, InfiniBand, and may be operated at one or more speeds, such as but not limited to 1 Gigabit per second (1 Gb) Ethernet, 10 Gb Ethernet, etc.

Platform telemetry controller and interfaces 216 represent one or more telemetry controllers and interfaces, which are depicted as coupled to telemetry devices 318 that provide various telemetry data regarding the server platform during run-time operations. These controllers and interfaces include but are not limited to an FC interface, a Platform Environment Control Interface (PECI), and a system management bus (SMBUS).

Connectivity to external flash block 218 is connected via a programmable flash interface 320 to a flash device 322 storing platform firmware (FW). Non-limiting examples of the flash devices and flash interfaces include eMMC (embedded Multi-Media Controller) devices and interfaces, a serial peripheral interface bus (SPI) or enhanced SPI (eSPI), and NAND flash.

Platform/solution deployment specific customization block 222 represents customized logic that may be deployed for specific platform configurations and/or provide solutions for specific tasks or workloads. Such tasks may or may not be dependent on the platform configuration. For example, the same or similar customized logic may be deployed for similar tasks under both the multiple single-socket server configuration and multi-socket server configurations, while other customized logic might be platform configuration specific.

Security primitives for Platform firmware recovery solution plus cryptographic accelerators block 224 provides a firmware recovery solution that is designed to prevent permanent denial of service attacks by detecting firmware corruption and automatically recovering the firmware on the system, quickly, and without human intervention. Cryptographic accelerators are implemented for functions such as SHA-256 to facilitate authentication. More generally, cryptographic accelerators may be used for encryption and/or decryption operations, including authentication and other purposes.

Figure 3D:
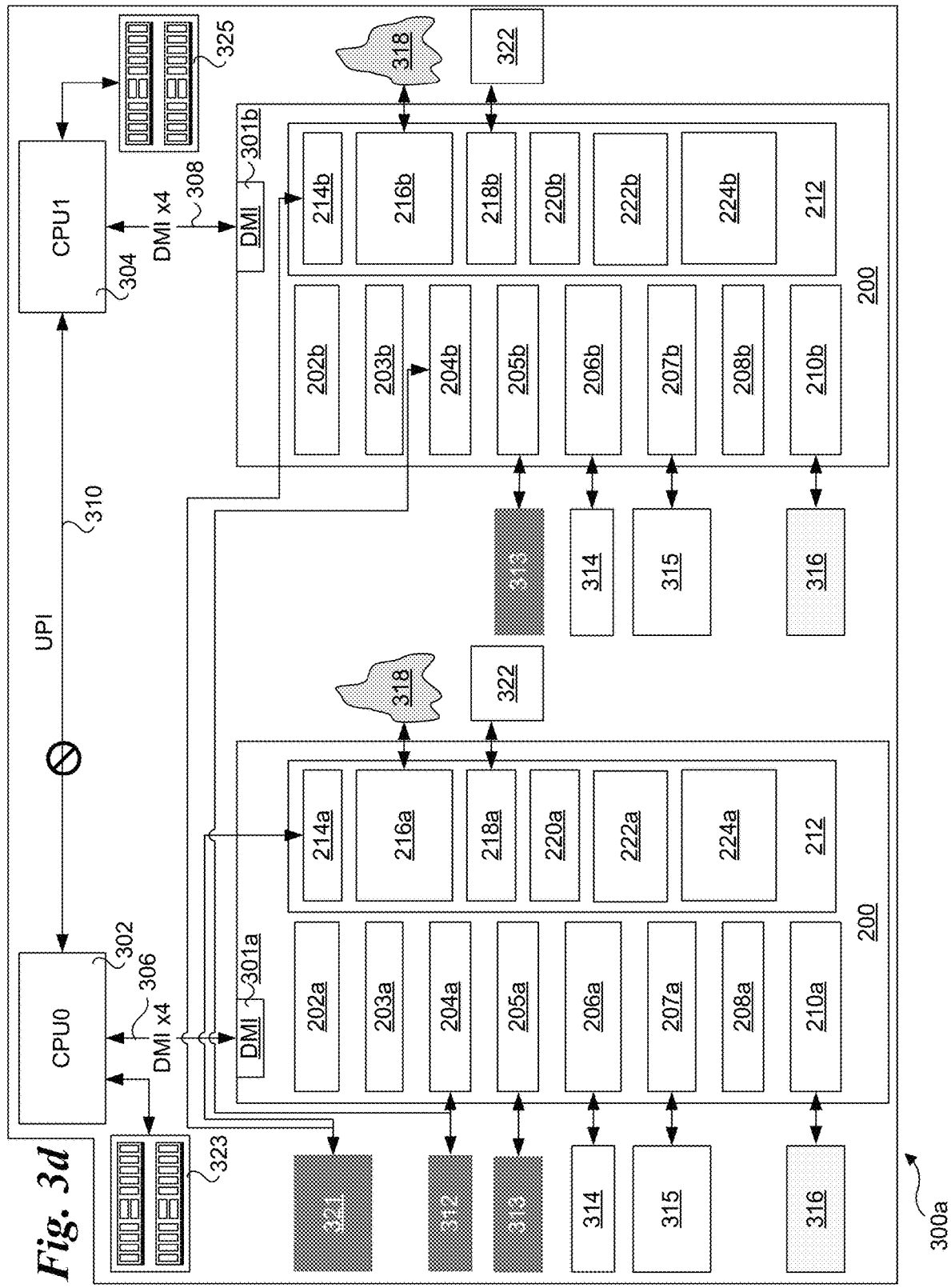
FIG. 3d is a schematic diagram of the self-morphing server platform of FIG. 3a configured as two single-socket server platforms.

FIG. 3d illustrates how the functional blocks and interfaces of SoC/FPGA platform manager 200 are implemented when self-morphing server platform architecture 300a is configured as two single-socket servers. As shown, under this configuration, UPI link 310 between CPUs 302 and 304 will be disabled.

In essence, when configured as single-socket servers, each server will have a full complement of interfaces and functionality supported by SoC/FPGA platform manager 200. For example, in the illustrated embodiment, a separate instance of a processor 202, legacy block 203, RFID block 204, a USB interface 205, a memory controller 206, PCIe interface 207, ME/NM block 208, network block 210, video/display IP block 214, platform telemetry controllers and interfaces 216, connectivity to external Flash block 218, platform power sequence control block 220, platform/solution deployment specific customization block 222, and security primitives for platform firmware recovery solution plus cryptographic accelerators block 224 is provided for each of CPUs 302 and 304, as depicted by reference numbers 202a and 202b, 203a and 203a, etc. As further shown, some of the components external to SoC/FPGA platform manager 200 are shared, while other external components are dedicated for each server. In the illustrated embodiment, video display 321 and RFID tags 312 are shared, while M.2 SSD 315 and network interface 316 are dedicated. However, this is merely one exemplary non-limiting configuration, as the optional boot images may be stored as separate boot images on the same SSD, and network interface may be a single or multi-port network interface that may be shared across multiple single-socket servers. In addition, although two instances of processor 202 (202a and 202b) are shown, this may be implemented as either a single core processor supporting both of the single-socket servers employing CPUs 302 and 304, or as a single multi-core processor, with separate cores used to support respective single-socket servers.

Each of self-morphing server platform architectures 300a, 300b, and 300c shows a two-socket server platform. However, the same concept can be scaled to two or more (e.g., a number n) sockets. Further a single compute platform having four or more sockets could be configured in more than two configurations, such as 4 single socket servers, a four-socket server, 2 dual-socket servers, or a combination of 2 single socket servers and a dual-socket server. Generally, the SoC/FPGA platform manager for an n-socket self-morphing server platform may have up to n instances of each functional block or interface that is to be dedicated to each of the n CPUs when operating in a multiple single-socket server configuration. As before, some of the server platform resources, such as the KM or KVM, and video display may be shared across the single-socket servers. In a manner similar to that discussed above, an n-core processor may be configured with each core dedicated for use with a respective single-socket server in an n-socket self-morphing server platform.

Generally, interfaces used for platform telemetry, loading of firmware images etc. may be implemented in the programmable logic offering greater flexibility to configure the number of devices connected, choose the specific protocols used for specific platforms and also customize the controller logic to adapt to specific needs of the platform. This customization capability also provides greater flexibility to add custom security logic to meet specific security objectives important for the platform such as filtering of specific transactions or specific sequences that could be potentially malicious etc. Such filtering capability is more important to buses that access code and configuration data for specific components, which upon corruption due to handling of illegal sequences, could potentially lead to potential permanent denial of service.

The capability to filter/modify transactions and protocols could potentially be able to work around issues and prevent such scenarios. Different filters may be applied for different components based on type of device, manufacturer, etc., could be different based on the type of component/device being protected. Programmable logic provides the ability to apply custom filters for respective platforms that may choose different components based on varying requirements in addition to being able to react to and fix late bug findings to patch critical reset and security functionality.

Early Boot Sequence

The SoC/FPGA-based platform manager is the master controller that initiates the platform boot sequence from time zero. The platform controller is the first component to receive power. In one embodiment, it is able to configure itself by loading a signed and verified bit-stream of programmable logic along with the firmware loaded on the SoC processor subsystem. Both processor firmware as well as programmable logic can be developed and signed entirely by the entity designing the platforms. At this time, the platform manager is configured and ready to continue to the next stage of the boot sequence.

Different platforms may have slightly different boot sequences based on design choices. Programmable logic in the platform manager provides the ability to customize the platform power up sequence (role traditionally played by additional complex programmable logic devices (CPLD) devices on the platform). The power-up sequence logic in platform power sequence control block 220 brings the different components up in the desired order.

Figure 4A:
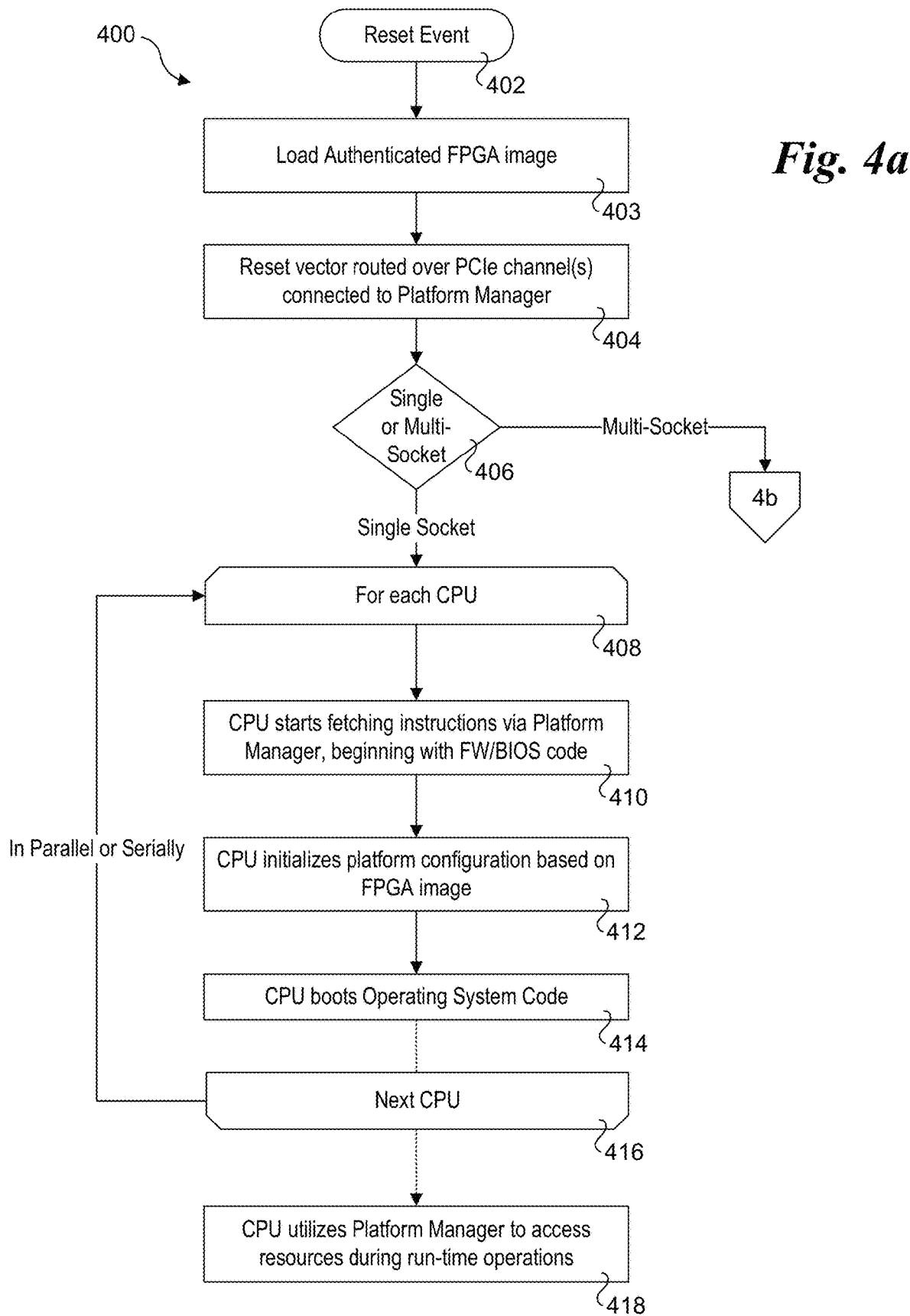
FIGS. 4a and 4b collectively show a flowchart illustrating operation and logic for configuring an running the self-morphing server platforms of FIGS. 3a-3d, according to one embodiment.
Figure 4B:
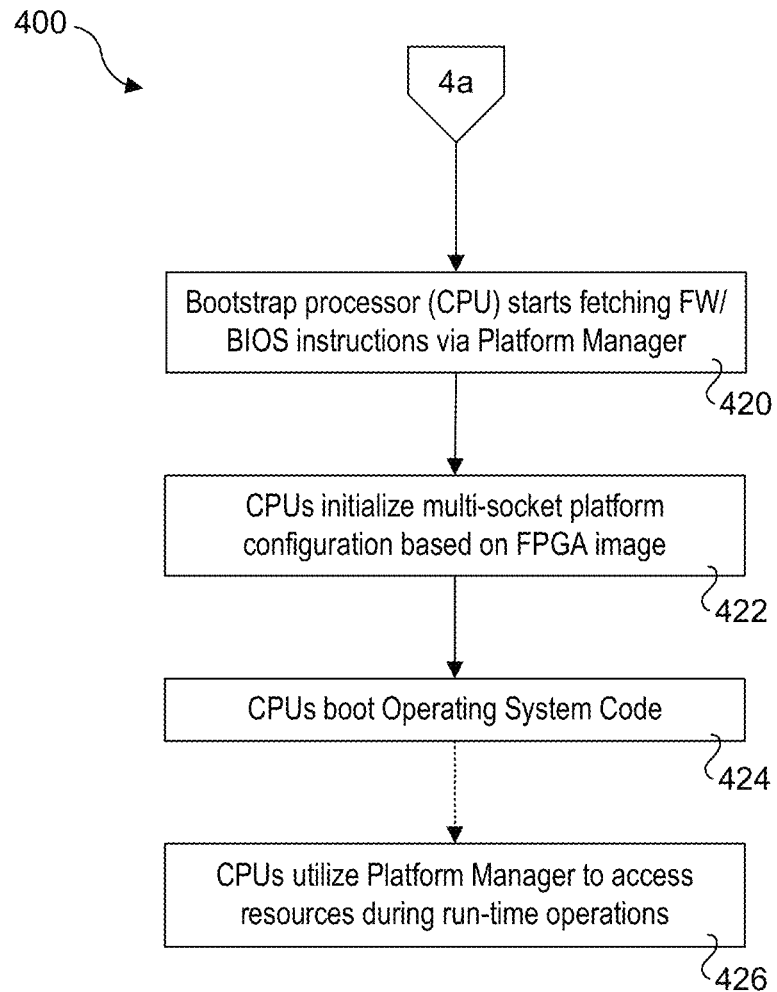

Operations and logic for dynamically configuring a platform using a platform manager are illustrated in a flowchart 400 in FIGS. 4a and 4b. The process starts with a reset event 402, which may be either a cold boot or warm reset. In a block 403 authenticated FPGA image is loaded as a bitstream. The authenticated FPGA image is used to program the various programmable blocks in FPGA 212. In one embodiment, the FPGA image is loaded from a storage device over a trusted channel. Optionally, the FPGA image may be downloaded from a network, and an optional authentication scheme may be employed to authenticate the image, such as via remote attestation, prior to programming the FPGA. Under an alternative scheme, trusted FPGA boot code may be loaded in block 403, which may be subsequently used to load the FPGA image.

In one embodiment, the server CPUs are x86 CPUs that have a specially modified reset sequence to be able to boot in PCIe mode. Accordingly, in a block 404 the reset vector is routed over the PCIe channels that are connected to the platform manager. In one embodiment, these are the same channels that are configured as the DMI (Direct Media Interface) lanes in traditional systems.

In a decision block 406 a determination is made to whether the CPUs in the platform are to be configured for use as multiple single-socket servers (single-socket mode) or a multi-socket server (multi-socket mode). In one embodiment, a configuration option is provided to decide whether the system comes up in single socket mode or multi-socket mode first. If the starting mode is a single-socket mode, the logic proceeds to a start loop block 408. As depicted by the return arrow from end loop block 416, the operations in blocks 410, 412, and 414 may be performed in parallel or serially. In the parallel case, the platform sequence releases the different CPU sockets out of reset, all at once. Alternatively, in the serial case they may be released from reset in a sequential fashion.

In block 410 the CPU starts fetching instructions including FW/BIOS code. In block 412, the CPU initializes the platform configuration based on the loaded FPGA image. In one embodiment, the CPU is enabled to determine which functional blocks in the FPGA are available, and the interfaces to each of such functional blocks. Subsequently, the CPU boots operating system code in block 414. Access to instructions for each of blocks 410, 412, and 414 is facilitated through the platform manager, which manages and arbitrates all these requests and provides responses from the appropriate boot devices (flash, SSD etc.). Each x86 system may have an independent view of its own devices. The platform manager manages the mapping of devices to the appropriate CPUs in this multiple single socket mode— either backed by independent devices for each CPU socket or consolidated under a single device behind the platform manager, as may be appropriate for different devices under different use conditions.

Once the OS's for the single-socket servers are booted, the single-socket servers perform ongoing run-time operations. As shown in a block 418, the CPU (for each single socket server) utilizes the platform manager to access various resources during run-time operations. During run-time, the platform manager also provides the platform manageability functions such as platform telemetry & thermal/power control, KVM, remote KVM, and other functions that would be performed by a baseboard management controller in a traditional platform architecture. For example, KVM operations may employ USB interface 205, telemetry operations employ platform telemetry controllers and interfaces 216, etc. Network access is facilitated by network block 210. In addition, custom operations may also be supported, such as hardened IP blocks, security, cryptographic accelerators, etc.

Returning to decision block 406, if the platform is to be configured as a multi-socket platform, the logic proceeds to the portion of flowchart 400 shown in FIG. 4b. In a block 420, a "bootstrap" processor (e.g., CPU 302) starts fetching the firmware/BIOS instructions via the platform manager. Generally, in a multi-socket server, one of the CPUs will be used to boot the firmware/BIOS, and is referred to as the bootstrap processor or bootstrap CPU.

In a block 422, the CPUs initialize the multi-socket platform configuration based on the FPGA image, wherein execution of the FPGA image will configure the programmable functional blocks and interfaces and determine which firmware/BIOS will be booted and which functional blocks and interfaces are available to the platform. Subsequently, as shown in a block 424, the operating system is loaded. During run-time operations the CPUs utilize the functional blocks in the SoC/FPGA platform manager to access system resources, as shown in a block 426.

The foregoing device management policy can be different in case the systems boots as a single multi-socket system. The different policy can be loaded as a completely different bit-stream (image) in the programmable component (FPGA 212) of the platform manager, or as configurable options within the same logic implementation. This way the system can boot all the way to the OS running different OS instances natively in case of the multiple single-socket system or a single OS instance natively in case of the multi-socket system. Legacy OS functions may be either emulated in optional legacy block 203, the programmable logic component of the platform manager, in CPU micro-code, or in BIOS, as appropriate.

Implementations Using Rack Scale Design

Recently, INTEL® Corporation introduced a new rack architecture called Rack Scale Design (RSD) (formerly called Rack Scale Architecture). Rack Scale Design is a logical architecture that disaggregates compute, storage, and network resources and introduces the ability to pool these resources for more efficient utilization of assets. It simplifies resource management and provides the ability to dynamically compose resources based on workload-specific demands.

RSD uses compute, fabric, storage, and management modules that work together to enable selectable configuration of a wide range of virtual systems. The design uses four basic pillars, which can be configured based on the user needs. These include 1) a Pod Manager (PODM) for multi-rack management, comprising firmware and software Application Program Interfaces (APIs) that enable resource and policy management and expose the hardware below and the orchestration layer above via a standard interface; 2) a Pooled system of compute, network, and storage resources that may be selectively composed based on workload requirements; 3) Pod-wide storage built on connected storage uses storage algorithms to support a range of usages deployed as a multi-rack resource or storage hardware and compute nodes with local storage; and 4) a configurable network fabric of hardware, interconnect with cables and backplanes, and management software to support a wide range of cost-effective network topologies, including current top-of-rack switch designs and distributed switches in the platforms.

Figure 5:
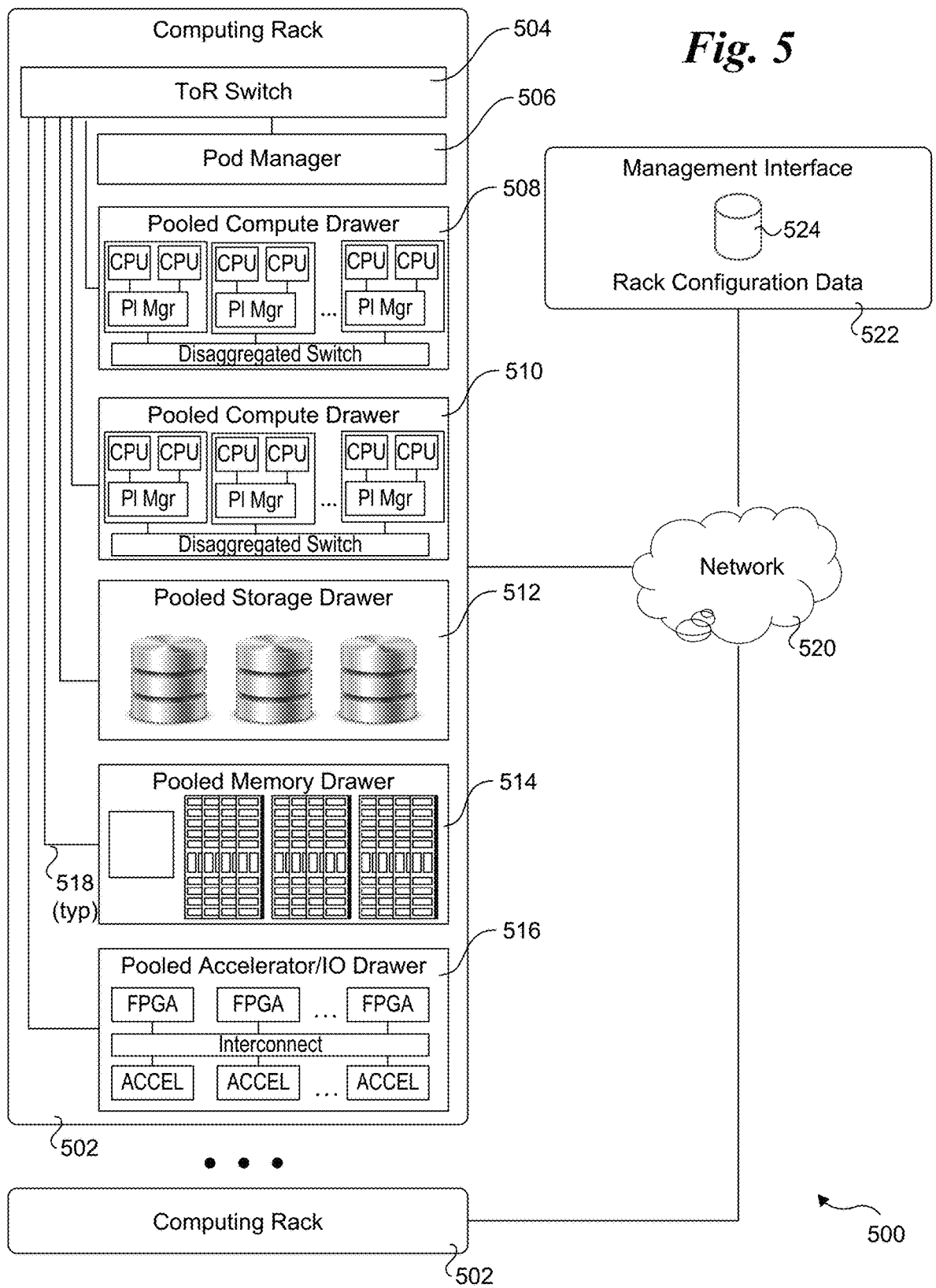
FIG. 5 is a schematic diagram of a Rack Scale Design (RSD) configuration in a data center, according to one embodiment.

An exemplary RSD environment 500 is illustrated in FIG. 5. RSD environment 500 includes multiple computing racks 502, each including a Top of Rack (ToR) switch 504, a pod manager 506, and a plurality of pooled system drawers. Generally, the pooled system drawers may include pooled compute drawer and pooled storage drawers. Optionally, the pooled system drawers may also include pooled memory drawers, pooled accelerator/IO drawers. In the illustrated embodiment the pooled system drawers include pooled computer drawers 508 and 510, a pooled storage drawer 512, a pooled memory drawer 514, and a pooled accelerator/IO drawer 516. Each of the pooled system drawers is connected to ToR switch 504 via a high-speed link 518, such as a 40 Gigabit/second (Gb/s) or 100 Gb/s Ethernet link or an 100+ Gb/s Silicon Photonics (SiPh) optical link. In one embodiment high-speed link 518 comprises an 800 Gb/s SiPh optical link.

Multiple of the computing racks 500 may be interconnected via their ToR switches 504 (e.g., to a pod-level switch or data center switch), as illustrated by connections to a network 520. In some embodiments, groups of computing racks 502 are managed as separate pods via pod manager(s) 506. In one embodiment, a single pod manager is used to manage all of the racks in the pod. Alternatively, distributed pod managers may be used for pod management operations.

RSD environment 500 further includes a management interface 522 that is used to manage various aspects of the RSD environment. This includes managing rack configuration, with corresponding parameters stored as rack configuration data 524.

Figure 6:
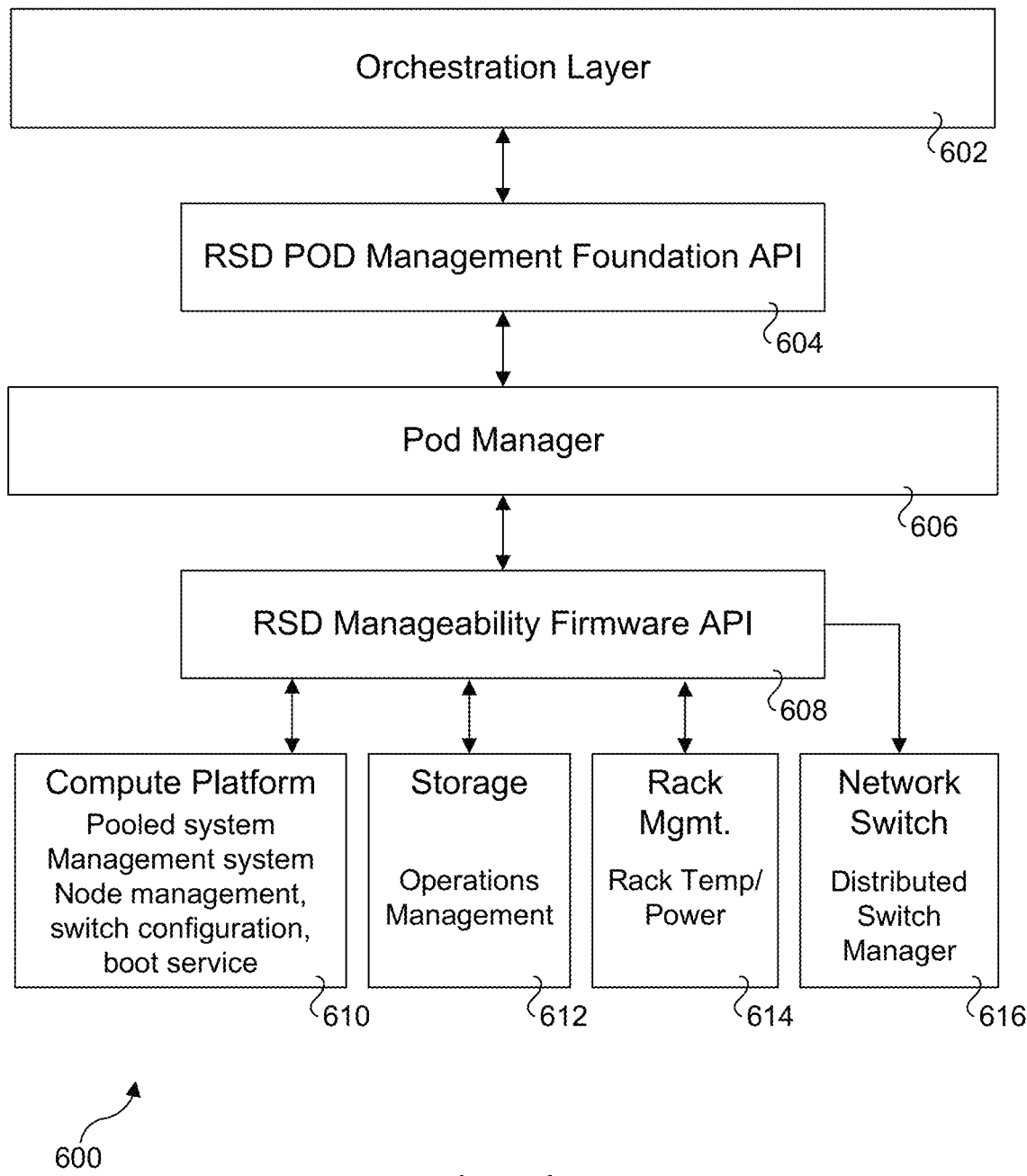
FIG. 6 is a block diagram of an RSD management architecture, according to one embodiment.

FIG. 6 shows one embodiment of an RSD management architecture 600. The RSD management architecture includes multiple software and firmware components configured in a layered architecture including an orchestration layer 602, an RSD pod management foundation API (Application Program Interface) 604, a pod manager 606, and an RSD manageability firmware API 608. The bottom layer of RSD management architecture includes a compute platform management component 610, a storage management component 612, rack management components 614, and a network switch management component 616.

The compute platform management component 610 performs operations associated with compute drawers and includes a pooled system, a management system, node management, switch configuration, and boot service. Storage management component 612 is configured to support operation management of pooled storage drawers. Rack management component 614 is configured to manage rack temperature and power sub-systems. Network switch management component includes a distributed switch manager.

INTEL® Rack Scale Design is designed to change the focus of platform architecture from single servers to converged infrastructure consisting of compute, network and storage, as discussed above and illustrated in FIG. 5. Management of resources is performed at the rack level and pod level. Focus on management of resources at the rack level also requires management of rack level environments such as power and cooling zones as well as providing a rack level root of trust for relative location information. This role is fulfilled by Rack Management Module (RMM), along with a sub-rack unit (the drawer units in RSD terminology) manager called a Pooled System Management Engine (PSME). The management elements of RSD, RMM and PSMEs are connected to a private network that is not accessible external to the rack, as shown in FIG. 7 and discussed below.

Figure 7:
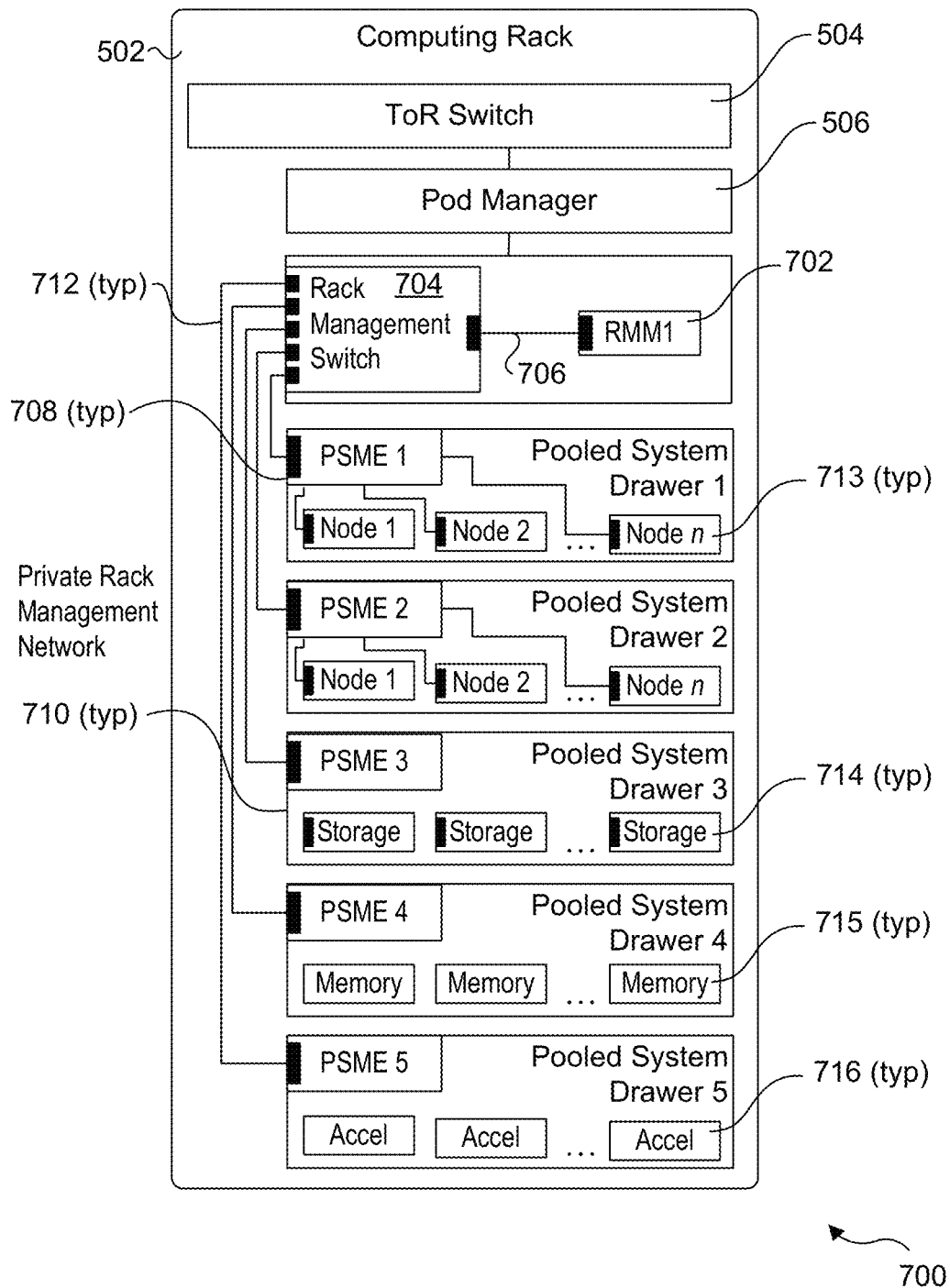
FIG. 7 is a schematic diagram showing further details of an RSD rack implementing Pooled System Management Engines (PSMEs)

FIG. 7 shows one embodiment of a rack configuration 700 employing rack management and configuration components that communicate over a private rack management network. The rack management and configuration components include an RMM 702 coupled in communication with a rack management switch 704 via a link 706. A respective PSME 708 is associated with each of five pooled system drawers 710. Each PSME 708 is connected to rack management switch 704 via a link 712. The rack management switch is also connected to POD Manager 506. In the illustrated embodiment, each of pooled system drawers 1 and 2 includes a plurality of compute nodes 713, while pooled system drawers 3, 4, and 5 respectively include a plurality of storage resources 714, a plurality of memory resources 715, and a plurality of IO accelerator resources 716.

In a datacenter environment such as RSD, the data center management software is able to compose various rack resources into a compute instance(s) or compute node that meets user performance requirements. In general, over allocation of resources to meet the performance results in inefficient utilization of the rack resource, leading to higher total cost of ownership (TCO) and lower return on investment (ROI).

Current enterprise/cloud computer systems have volatile memory, for example DRAM (Dynamic Random Access Memory) memory, and storage class non-volatile memory such as 3D crosspoint (3D XPOINT™) technology DIMMs (Dual In-line Memory Modules), which are populated locally within the compute node. Other types of memory may also be used.

Non-volatile memory is a storage medium that does not require power to maintain the state of data stored by the medium. Non-limiting examples of nonvolatile memory may include any or a combination of: solid state memory (such as planar or 3D NAND flash memory or NOR flash memory), 3D crosspoint memory, storage devices that use chalcogenide phase change material (e.g., chalcogenide glass), byte addressable nonvolatile memory devices, ferroelectric memory, silicon-oxide-nitride-oxide-silicon (SONOS) memory, polymer memory (e.g., ferroelectric polymer memory), ferroelectric transistor random access memory (Fe-TRAM) ovonic memory, nanowire memory, electrically erasable programmable read-only memory (EEPROM), other various types of non-volatile random access memories (RAMs), and magnetic storage memory. In some embodiments, 3D crosspoint memory may comprise a transistor-less stackable cross point architecture in which memory cells sit at the intersection of words lines and bit lines and are individually addressable and in which bit storage is based on a change in bulk resistance. In particular embodiments, a memory module with non-volatile memory may comply with one or more standards promulgated by the Joint Electron Device Engineering Council (JEDEC), such as JESD218, JESD219, JESD220-1, JESD223B, JESD223-1, or other suitable standard (the JEDEC standards cited herein are available at www.jedec.org).

Volatile memory is a storage medium that requires power to maintain the state of data stored by the medium. Examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of the memory modules complies with a standard promulgated by JEDEC, such as JESD79F for Double Data Rate (DDR) SDRAM, JESD79-2F for DDR2 SDRAM, JESD79-3F for DDR3 SDRAM, or JESD79-4A for DDR4 SDRAM (these standards are available at www.jedec.org). Such standards (and similar standards) may be referred to as DDR-based standards and communication interfaces of storage devices that implement such standards may be referred to as DDR-based interfaces.

In one embodiment, one or more of nodes 713 employs one of self-morphing server platform architecture 300*a*, 300*b*, or 300*c*. As described above and illustrated in FIGS.

2 and 3a-3d, the one or more nodes will include a SoC/FPGA platform manager 200, along with various platform resources to which SoC/FPGA platform manager 200 are coupled. Under the RSD architecture, such nodes may be dynamically composed via POD manager 506 and/or via management interface 522. In some embodiments, a PSME may be augmented to include an SoC/FPGA platform manager, or otherwise an SoC/FPGA platform manager may be configured to implement PSME functionality.

Figure 8:
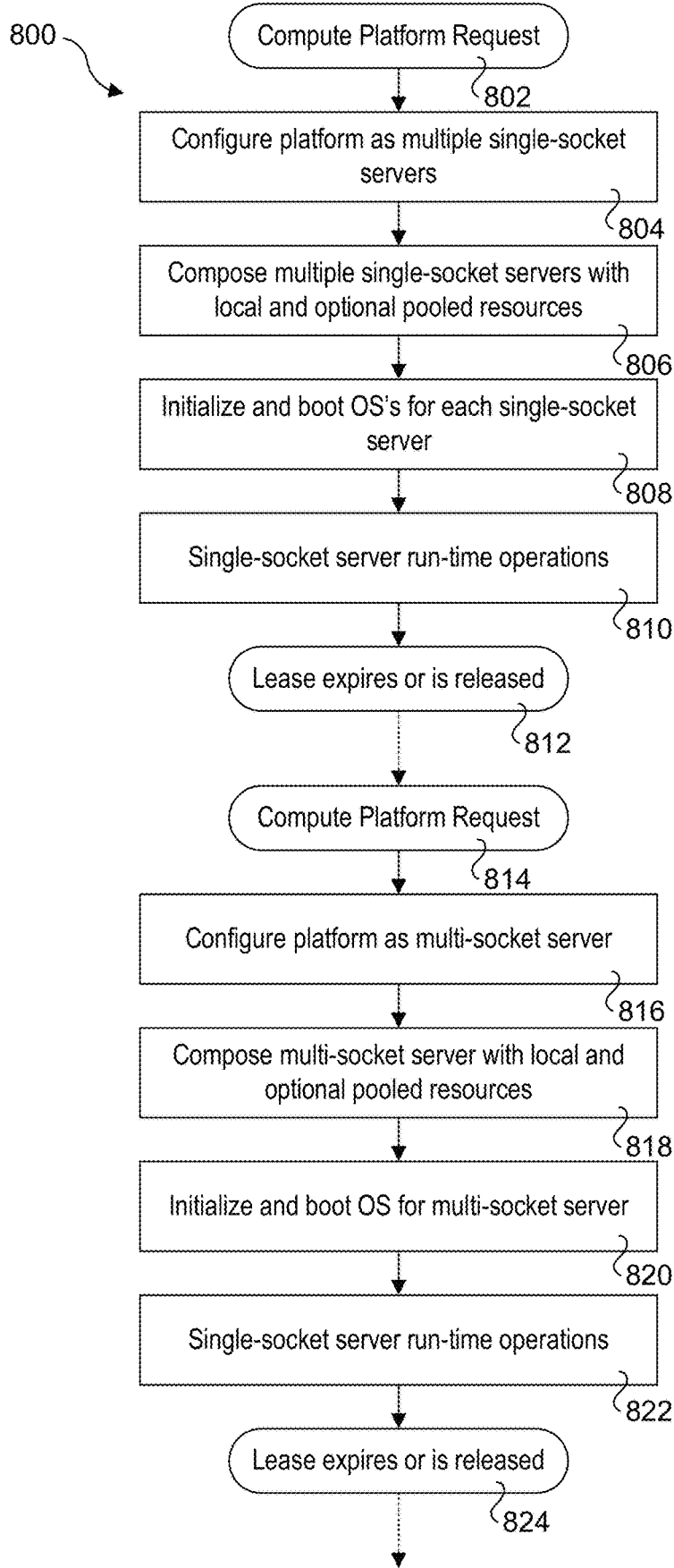
FIG. 8 is a flowchart illustrating operations for dynamically configuring and composing a self-morphing server platform as multiple single-socket servers and dynamically reconfiguring the self-morphing server platform as a multi-socket server.

FIG. 8 shows a flowchart 800 illustrating operations performed in connection with composing the same compute platform CPUs into multiple single-socket servers and then subsequently recomposing the compute platform as a multi-socket server. The process begins in a start block 802 in which a compute platform request is received. In this example, an IaaS provider leases RSD compute resources, and provides a Web interface or Web service to request access to the IaaS resources. In response to the request, RSD components are used to dynamically compose one or more servers to service the request.

In this first instance, the compute platform request will be serviced using multiple single socket servers. Accordingly, in a block 804 a self-morphing server platform is configured as multiple single-socket servers. In a block 806, the multiple single-socket servers are composed with local and optional pooled resources. This is accomplished through use of applicable RSD resources. For example, this will generally include composing systems with local memory, optional pooled memory, and pooled storage resources. Other resources may also be composed at this time, including use of pooled accelerator resources. After the single-socket servers are composed, they are initialized in a block 808, and their OS's are booted. Single-socket server run-time operations are then performed in a block 810.

At some point in time, the compute resource lease may expire or otherwise the single-socket servers may be shutdown in response to a lease being released. This is depicted in an end block 812. At the point, the self-morphing server platform hardware is made available to service other IaaS requests.

In a start block 814, a second compute platform request is received. This time, it is determined that the self-morphing server platform hardware is configured as a multi-socket server, as shown in a block 816. In a block 818 the multi-socket server is composed with local and optional pooled resources. The multi-socket server is then initialized and its operating system is booted in a block 820, followed by run-time operations being performed in a block 822. Subsequently, the lease will expire or be released, as depicted in an end block 824, and the self-morphing server platform hardware may be dynamically reconfigured to service another IaaS request.

Further aspects of the subject matter described herein are set out in the following numbered clauses:

1. An apparatus, to be implemented in a server platform including a plurality of Central Processing Units (CPUs) installed in respective sockets, comprising:
at least one link interface configured to be connected to a respective CPU or to a switch connected to the plurality of CPUs;
a plurality of predefined functional blocks and interfaces; and
a plurality of dynamically configurable functional blocks and interfaces,
wherein the plurality of dynamically configurable functional blocks and interfaces enable the server platform to be dynamically configured as a plurality of single-socket servers or at least one multi-socket server.

2. The apparatus of clause 1, wherein the apparatus comprises a System on a Chip (SoC) including at least one processor.

3. The apparatus of clause 1 or 2, wherein the plurality of dynamically configurable functional blocks and interfaces comprise programmable logic elements in a field programmable gate array (FPGA).

4. The apparatus of any of the preceding clauses, wherein the plurality of CPUs include n CPUs, and the apparatus includes n instances of at least a portion of the plurality of predefined functional blocks and interfaces.

5. The apparatus of any of the preceding clauses, wherein the plurality of CPUs include n CPUs, and the apparatus includes n instances of at least a portion of the dynamically configurable functional blocks and interfaces.

6. The apparatus of any of the preceding clauses, wherein the plurality of dynamically configurable functional blocks and interfaces include one or more platform telemetry controllers and interfaces.

7. The apparatus of any of the preceding clauses, wherein the plurality of dynamically configurable functional blocks and interfaces includes a programmable flash storage device interface.

8. The apparatus of any of the preceding clauses, wherein the plurality of dynamically configurable functional blocks and interfaces include a platform power sequence control block.

9. The apparatus of any of the preceding clauses, wherein the plurality of dynamically configurable functional blocks and interfaces includes a deployment-specific customization block.

10. The apparatus of any of the preceding clauses, wherein the plurality of dynamically configurable functional blocks include security primitives for platform firmware recovery.

11. A server platform comprising:
a plurality of Central Processing Units (CPUs), each installed in a respective socket;
at least one coherent socket-to-socket link interconnecting a pair of sockets; and
a platform manager component, communicatively coupled to the plurality of CPUs, the platform manager including,
a plurality of predefined functional blocks and interfaces; and
a plurality of dynamically configurable functional blocks and interfaces,
wherein the plurality of dynamically configurable functional blocks and interfaces enable the server platform to be dynamically configured as a plurality of single-socket servers or at least one multi-socket server.

12. The server platform of clause 11, wherein the platform manager component comprises a System on a Chip (SoC) including at least one processor.

13. The server platform of clause 12, wherein the plurality of dynamically configurable functional blocks and interfaces comprise programmable logic elements in a field programmable gate array (FPGA) that is embedded in the SoC.

14. The server platform of any of clauses 11-13, wherein the plurality of CPUs include n CPUs installed in n sockets, the apparatus includes n instances of at least a portion of the plurality of predefined functional blocks and interfaces, and wherein the server platform is dynamically configurable as n single-socket servers and as an n-socket server.

15. The server platform of any of clauses 11-14, wherein the plurality of CPUs include n CPUs installed in n sockets, the apparatus includes n instances of at least a portion of the dynamically configurable functional blocks and interfaces, and wherein the server platform is dynamically configurable as n single-socket servers and as an n-socket server.

16. The server platform of any of clauses 11-15, wherein the plurality of dynamically configurable functional blocks and interfaces include one or more platform telemetry controllers and interfaces coupled to at least one telemetry device;

17. The server platform of any of clauses 11-16, wherein the plurality of dynamically configurable functional blocks and interfaces includes a programmable flash storage device interface coupled to at least one flash storage device.

18. The server platform of any of clauses 11-17, wherein the plurality of dynamically configurable functional blocks and interfaces include a platform power sequence control block.

19. The server platform of any of clauses 11-18, wherein the plurality of dynamically configurable functional blocks and interfaces includes a deployment-specific customization block.

20. The server platform of any of clauses 11-19, wherein the plurality of dynamically configurable functional blocks include security primitives for platform firmware recovery.

21. A method comprising:
dynamically configuring a server platform including a plurality of Central Processing Units (CPUs), each installed in a respective socket, in a first configuration comprising a plurality of single socket servers; and
dynamically reconfiguring the server platform as a multi-socket server platform including the plurality of CPUs.

22. The method of clause 21, wherein the server platform includes a platform management component coupled to the plurality of CPUs including a Field Programmable Gate Array (PFGA), the method further comprising:
loading a first bitstream comprising a first FPGA image in the FPGA, causing the FPGA to implement a first plurality of functional blocks and interfaces to support boot up and run-time operations of the server platform in the first configuration comprising the plurality of single socket servers;
initializing each of the plurality of single socket servers using at least one of the first plurality of functional blocks and interfaces;
performing run-time operations using the plurality of single socket servers;
one of resetting or shutting down the server platform;
loading a second bitstream comprising a second FPGA image in the FPGA, causing the FPGA to implement a second plurality of functional blocks and interfaces to support boot up and run-time operations of the server platform in the second configuration comprising the multi-socket server;
initializing the multi-socket server using at least one of the second plurality of functional blocks and interfaces; and
performing run-time operations using the multi-socket server.

23. The method of clause 22, wherein the management components comprises a System on a Chip (SoC) including an embedded FPGA, at least one processor, and a plurality of pre-defined functional blocks and interfaces, at least a portion of which have duplicate instances; the method further comprising:
implementing respective instances of the at least a portion of the functional blocks and interfaces that have duplicate instances for respective single-socket servers when the server platform is configured in the first configuration as a plurality of single-socket servers.

24. The method of clause 22 or 23, wherein the plurality of sockets are interconnected via at least one coherent socket-to-socket link, the method further comprising:
utilizing the at least one coherent socket-to-socket link to implement the server platform as a Non-Uniform Memory Architecture (NUMA) server under the second configuration; and
disabling the at least one coherent socket-to-socket link when the server platform is configured to operate as a plurality of single-socket servers.

25. The method of any of clauses 21-24, wherein the server platform is implemented in a pooled compute drawer of a disaggregated rack architecture including a rack in which a plurality of pooled system drawers are installed including the pooled compute drawer and at least one of a pooled memory drawer, a pooled storage drawer, and a pooled accelerator drawer, the method further comprising:
for at least one of the plurality of single-socket servers,
dynamically composing a single socket server including a CPU in the pooled compute drawer communicatively coupled to at least one of a memory device, storage device, and accelerator in at least one of the pooled memory drawer, the pooled storage drawer, and the pooled accelerator drawer.

26. The method clause 25, further comprising dynamically composing a multi-socket server including a plurality of CPUs in the pooled compute drawer communicatively coupled to at least one of a memory device, storage device, and accelerator in at least one of the pooled memory drawer, the pooled storage drawer, and the pooled accelerator drawer.

27. The method of any of clauses 21-26, further comprising sharing keyboard and mouse input devices across the plurality of single-socket servers.

28. The method of any of clauses 21-27, further comprising sharing a video display across the plurality of single-socket servers.

29. The method of any of clauses 21-28, wherein the plurality of dynamically configurable functional blocks and interfaces include one or more platform telemetry controllers and interfaces, the method further comprising receiving data from one or more telemetry devices coupled to the one or more platform telemetry controllers and interfaces.

30. The method of any of clauses 21-29, wherein the plurality of dynamically configurable functional blocks and interfaces includes a programmable flash storage device interface, the method further comprising access a flash storage device using the programmable flash storage device interface.

31. The method of any of clauses 21-30, wherein the plurality of dynamically configurable functional blocks and interfaces include a platform power sequence control block, the method further comprising employing the platform power sequence block to power up the server platform following one of a platform shutdown or reset.

32. The method of any of clauses 21-31, wherein the plurality of dynamically configurable functional blocks and interfaces includes a deployment-specific customization block.

33. The method of any of clauses 21-32, wherein the plurality of dynamically configurable functional blocks include security primitives for platform firmware recovery.

34. A server platform comprising:
a plurality of Central Processing Units (CPUs), each installed in a respective socket;

at least one coherent socket-to-socket link interconnecting a pair of sockets; and means for, dynamically configuring the server platform in a first configuration comprising a plurality of single socket servers; and dynamically reconfiguring the server platform as a multi-socket server platform including the plurality of CPUs.

35. The server platform of clause 34, wherein the server platform includes a platform management component coupled to the plurality of CPUs including a Field Programmable Gate Array (PFGA), further comprising means for:

loading a first bitstream comprising a first FPGA image in the FPGA, causing the FPGA to implement a first plurality of functional blocks and interfaces to support boot up and run-time operations of the server platform in the first configuration comprising the plurality of single socket servers;

initializing each of the plurality of single socket servers using at least one of the first plurality of functional blocks and interfaces;

loading a second bitstream comprising a second FPGA image in the FPGA, causing the FPGA to implement a second plurality of functional blocks and interfaces to support boot up and run-time operations of the server platform in the second configuration comprising the multi-socket server; and initializing the multi-socket server using at least one of the second plurality of functional blocks and interfaces.

36. The server platform of clause 35, wherein the platform management component comprises a System on a Chip (SoC) including an embedded FPGA, at least one processor, and a plurality of pre-defined functional blocks and interfaces, at least a portion of which have duplicate instances, further comprising means for implementing respective instances of the at least a portion of the functional blocks and interfaces that have duplicate instances for respective single-socket servers when the server platform is configured in the first configuration as a plurality of single-socket servers.

37. The server platform of clause 35 or 36, wherein the plurality of sockets are interconnected via at least one coherent socket-to-socket link, further comprising means for:

utilizing the at least one coherent socket-to-socket link to implement the server platform as a Non-Uniform Memory Architecture (NUMA) server under the second configuration; and disabling the at least one coherent socket-to-socket link when the server platform is configured to operate as a plurality of single-socket servers.

38. The server platform of any of clauses 34-37, further comprising means for sharing keyboard and mouse input devices across the plurality of single-socket servers.

39. The server platform of any of clauses 34-38, further comprising means for sharing a video display across the plurality of single-socket servers.

In addition, embodiments of the present description may be implemented not only within a semiconductor chip but also within machine-readable media. For example, the designs described above may be stored upon and/or embedded within machine readable media associated with a design tool used for designing semiconductor devices. Examples include a netlist formatted in the VHSIC Hardware Description Language (VHDL) language, Verilog language or SPICE language. Some netlist examples include: a behavioral level netlist, a register transfer level (RTL) netlist, a gate level netlist and a transistor level netlist. Machine-readable media also include media having layout information such as a GDS-II file. Furthermore, netlist files or other machine-readable media for semiconductor chip design may be used in a simulation environment to perform the methods of the teachings described above.

Although some embodiments have been described in reference to particular implementations, other implementations are possible according to some embodiments. Additionally, the arrangement and/or order of elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

In the description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An embodiment is an implementation or example of the inventions. Reference in the specification to "an embodiment," "one embodiment," "some embodiments," or "other embodiments" means that a particular feature, structure, or characteristic described in connection with the embodiments is included in at least some embodiments, but not necessarily all embodiments, of the inventions. The various appearances "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

As discussed above, various aspects of the embodiments herein may be facilitated by corresponding software and/or firmware components and applications, such as software and/or firmware executed by an embedded processor or the like. Thus, embodiments of this invention may be used as or to support a software program, software modules, firmware, and/or distributed software executed upon some form of processor, processing core or embedded logic a virtual machine running on a processor or core or otherwise implemented or realized upon or within a computer-readable or machine-readable non-transitory storage medium. A computer-readable or machine-readable non-transitory storage medium includes any mechanism for storing or transmitting information in a form readable by a machine (e.g., a computer). For example, a computer-readable or machine-readable non-transitory storage medium includes any mechanism that provides (i.e., stores and/or transmits) information in a form accessible by a computer or computing machine (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer-readable or machine-readable non-transitory storage medium may also include a storage or database from which content can be downloaded. The computer-readable or machine-readable non-transitory storage medium may also include a device or product having content stored thereon at a time of sale or delivery. Thus, delivering a device with stored content, or offering content for download over a communication medium may be understood as providing an article of manufacture comprising a computer-readable or machine-readable non-transitory storage medium with such content described herein.

Various components referred to above as processes, servers, or tools described herein may be a means for performing the functions described. The operations and functions performed by various components described herein may be implemented by software running on a processing element, via embedded hardware or the like, or any combination of hardware and software. Such components may be implemented as software modules, hardware modules, special-purpose hardware (e.g., application specific hardware, ASICs, DSPs, etc.), embedded controllers, hardwired circuitry, hardware logic, etc. Software content (e.g., data, instructions, configuration information, etc.) may be provided via an article of manufacture including computer-readable or machine-readable non-transitory storage medium, which provides content that represents instructions that can be executed. The content may result in a computer performing various functions/operations described herein.

As used herein, a list of items joined by the term "at least one of" can mean any combination of the listed terms. For example, the phrase "at least one of A, B or C" can mean A; B; C; A and B; A and C; B and C; or A, B and C.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the drawings. Rather, the scope of the invention is to be determined entirely by the following claims, which are to be construed in accordance with established doctrines of claim interpretation.

What is claimed is:

1. A server platform comprising:
    a plurality n Central Processing Units (CPUs), where n is a number of two or more, each installed in a respective socket;
    at least one coherent socket-to-socket link interconnecting a pair of sockets; and
    a platform manager component, communicatively coupled to the plurality of CPUs, the platform manager including,
        a plurality of predefined functional blocks and interfaces; and
        a plurality of dynamically configurable functional blocks and interfaces,
    wherein the plurality of dynamically configurable functional blocks and interfaces enable the server platform to be dynamically configured as n single-socket servers or an n-socket server, and
    wherein the server platform includes n instances of at least a portion of the plurality of predefined functional blocks and interfaces.

2. The server platform of claim 1, wherein the platform manager component comprises a System on a Chip (SoC) including at least one processor.

3. The server platform of claim 2, wherein the plurality of dynamically configurable functional blocks and interfaces comprise programmable logic elements in a field programmable gate array (FPGA) that is embedded in the SoC.

4. The server platform of claim 1, wherein the plurality of CPUs include n CPUs installed in n sockets, the server platform includes n instances of at least a portion of the dynamically configurable functional blocks and interfaces, and wherein the server platform is dynamically configurable as n single-socket servers and as an n-socket server.

5. The server platform of claim 1, wherein the plurality of dynamically configurable functional blocks and interfaces include one or more platform telemetry controllers and interfaces coupled to at least one telemetry device.

6. The server platform of claim 1, wherein the plurality of dynamically configurable functional blocks and interfaces includes a programmable flash storage device interface coupled to at least one flash storage device.

7. The server platform of claim 1, wherein the plurality of dynamically configurable functional blocks and interfaces include a platform power sequence control block.

8. The server platform of claim 1, wherein the plurality of dynamically configurable functional blocks and interfaces includes a deployment-specific customization block.

9. The server platform of claim 1, wherein the plurality of dynamically configurable functional blocks include security primitives for platform firmware recovery.

10. A method performed by a server platform having a platform management component including a Field Programmable Gate Array (PFGA) coupled to a plurality of Central Processing Units (CPUs), each CPU installed in a respective socket, comprising:
    dynamically configuring the server platform in a first configuration comprising a plurality of single socket servers by loading a first bitstream comprising a first FPGA image in the FPGA, causing the FPGA to implement a first plurality of functional blocks and interfaces to support boot up and run-time operations of the server platform in the first configuration;
    initializing each of the plurality of single socket servers using at least one of the first plurality of functional blocks and interfaces;
    performing run-time operations using the plurality of single socket servers;
    one of resetting or shutting down the server platform;
    dynamically reconfiguring the server platform as a multi-socket server platform including the plurality of CPUs by loading a second bitstream comprising a second FPGA image in the FPGA, causing the FPGA to implement a second plurality of functional blocks and interfaces to support boot up and run-time operations of the server platform in the second configuration comprising the multi-socket server;

initializing the multi-socket server using at least one of the second plurality of functional blocks and interfaces; and performing run-time operations using the multi-socket server.

11. The method of claim 10, wherein the management components comprises a System on a Chip (SoC) including an embedded FPGA, at least one processor, and a plurality of pre-defined functional blocks and interfaces, at least a portion of which have duplicate instances; the method further comprising: implementing respective instances of the at least a portion of the functional blocks and interfaces that have duplicate instances for respective single-socket servers when the server platform is configured in the first configuration as a plurality of single-socket servers.

12. The method of claim 10, wherein the plurality of sockets are interconnected via at least one coherent socket-to-socket link, the method further comprising: utilizing the at least one coherent socket-to-socket link to implement the server platform as a Non-Uniform Memory Architecture (NUMA) server under the second configuration; and disabling the at least one coherent socket-to-socket link when the server platform is configured to operate as a plurality of single-socket servers.

13. The method of claim 10, wherein the server platform is implemented in a pooled compute drawer of a disaggregated rack architecture including a rack in which a plurality of pooled system drawers are installed including the pooled compute drawer and at least one of a pooled memory drawer, a pooled storage drawer, and a pooled accelerator drawer, the method further comprising:

for at least one of the plurality of single-socket servers, dynamically composing a single socket server including a CPU in the pooled compute drawer communicatively coupled to at least one of a memory device, storage device, and accelerator in at least one of the pooled memory drawer, the pooled storage drawer, and the pooled accelerator drawer.

14. A server platform comprising:
a plurality n Central Processing Units (CPUs), where n is a number of two or more, each installed in a respective socket;
at least one coherent socket-to-socket link interconnecting a pair of sockets; and
a platform manager component, communicatively coupled to the plurality of CPUs, the platform manager including,
a plurality of predefined functional blocks and interfaces; and
a plurality of dynamically configurable functional blocks and interfaces,
wherein the plurality of dynamically configurable functional blocks and interfaces enable the server platform to be dynamically configured as n single-socket servers or an n-socket server, and
wherein the server platform includes n instances of at least a portion of the plurality of dynamically configurable functional blocks and interfaces.

15. The server platform of claim 14, wherein the platform manager component comprises a System on a Chip (SoC) including at least one processor.

16. The server platform of claim 15, wherein the plurality of dynamically configurable functional blocks and interfaces comprise programmable logic elements in a field programmable gate array (FPGA) that is embedded in the SoC.

17. The server platform of claim 14, wherein the plurality of CPUs include n CPUs installed in n sockets, the server platform includes n instances of at least a portion of the plurality of predefined functional blocks and interfaces, and wherein the server platform is dynamically configurable as n single-socket servers and as an n-socket server.

18. The server platform of claim 14, wherein the plurality of dynamically configurable functional blocks and interfaces include one or more platform telemetry controllers and interfaces coupled to at least one telemetry device.

19. The server platform of claim 14, wherein the plurality of dynamically configurable functional blocks and interfaces includes a programmable flash storage device interface coupled to at least one flash storage device.

20. The server platform of claim 14, wherein the plurality of dynamically configurable functional blocks and interfaces include a platform power sequence control block.

21. The server platform of claim 14, wherein the plurality of dynamically configurable functional blocks and interfaces includes a deployment-specific customization block.

22. The server platform of claim 14, wherein the plurality of dynamically configurable functional blocks include security primitives for platform firmware recovery.

* * * * *